United States Patent Office

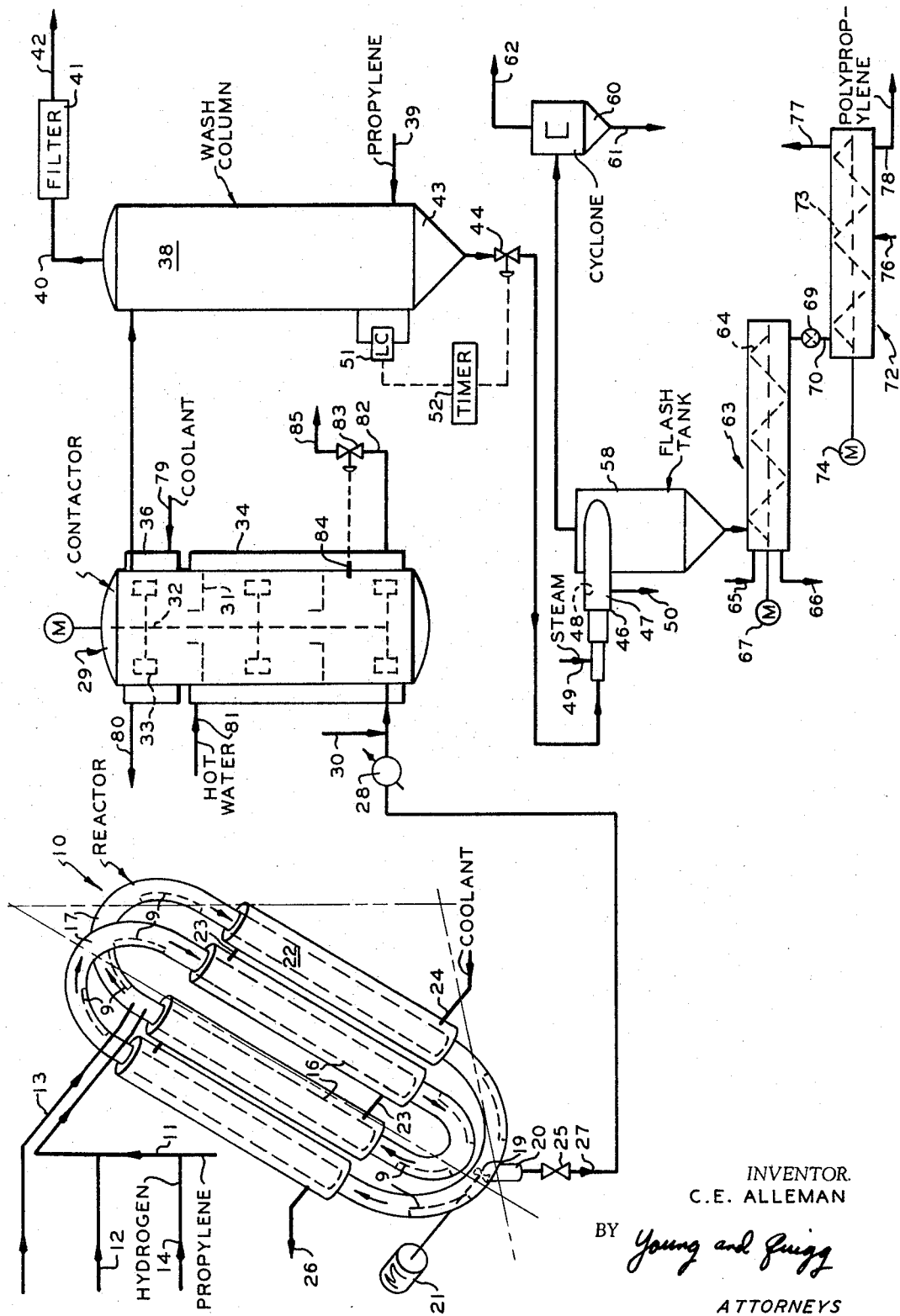

3,324,093
Patented June 6, 1967

3,324,093
LOOP REACTOR
Carl E. Alleman, Bartlesville, Okla., assignor to Phillips
Petroleum Company, a corporation of Delaware
Filed Oct. 21, 1963, Ser. No. 317,455
4 Claims. (Cl. 260—88.2)

This invention relates to a loop reactor. In one aspect the invention relates to method and apparatus for catalytically polymerizing monomers in a loop reactor. In another aspect the invention relates to a method for the recovery of solids from a continuous path reaction zone.

It is disclosed in Hogan et al. U.S. Patent 2,825,721 that unique polymers and copolymers can be produced by contacting one or more olefins with a catalyst comprising as an essential ingredient chromium oxide and preferably including a substantial amount of hexavalent chromium. The chromium oxide is associated with at least one other oxide particularly selected from a group consisting of silica, alumina, zirconia and thoria. A suitable olefin feed used for the polymerization is at least one olefin selected from 1-olefins having a maximum of 8 carbon atoms per molecule and no branching nearer the double bond than the 4-position. Examples of olefins which can be polymerized by the described method include ethylene, propylene, 1-butene, 1-pentene and 1,3-butadiene. Copolymers, such as ethylene-propylene copolymers and ethylene-butadiene copolymers, can also be prepared by utilizing the chromium oxide containing catalyst. The temperature for the polymerization reaction is usually in the range of about 100 to about 500° F. with a temperature in the range of 275 to 375° F. being often preferred for the polymerization of ethylene. The olefins are polymerized in the presence of a hydrocarbon diluent, for example, an acyclic, alicyclic or aromatic compound which is inert.

Recently it has been discovered that there is a critical polymerization temperature range within the broad range disclosed by Hogan et al. in which it is possible to produce increased yields of high molecular weight polymers of olefins which are insoluble in the hydrocarbon diluent. This polymer is formed in association with the polymerization catalyst and is suspended in the liquid diluent in solid particle form. In the following discussion the term "particle form polymer" will be employed to designate a polymer of an olefin formed as a particulate solid in a diluent at the conditions of polymerization.

Another suitable, but non-equivalent, method of producing highly crystalline, high density polymers comprises contacting an olefin such as ethylene, propylene, 1-butene, and the like, with a two or more component catalyst wherein one component is an organometal compound, including those where one or more but not all organo groups, is replaced by a halogen, a metal hydride, or a metal of Group I, II or III, and the second component is a Group IV to VI metal compound, e.g., salt or alcoholate. A third catalyst component which can be used advantageously is an organic halide or metal halide where the organic radical has thirty or less carbon atoms, and is advantageously an alkyl, cycloalkyl or aryl group. These catalysts are more fully discussed in the patent of W. B. Reynolds et al., Patent 2,886,561, issued May 12, 1959, and specific examples of such compounds are disclosed therein. The reaction using these catalysts is preferably carried out in the presence of a hydrocarbon diluent in liquid phase at a temperature in the range from room temperature up to about 300° F.

A particularly suitable catalyst for the polymerization of propylene to a solid particle form polymer is a two-component catalyst system: (a) a dialkylaluminum halide compound and (b) a titanium trichloride complex. The dialkylaluminum halide compound can be represented by the formula RR'AlX wherein R and R' are selected from alkyl groups having from 1 to 12, inclusive, carbon atoms and wherein R and R' can be the same or different alkyl groups, and X is a halogen selected from chlorine, bromine, iodine or fluorine, preferably chlorine. Representative examples of suitable alkyl groups include methyl, ethyl, propyl, isobutyl, hexyl, octyl, decyl, dodecyl, and the like. A very suitable dialkylaluminum halide is diethylaluminum chloride. If desired, mixtures of dialkylaluminum halides can be used in the invention.

As previously mentioned, the second component of the catalyst system is a $TiCl_3$ complex, which can be formed by reacting aluminum with titanium tetrachloride. The preferred $TiCl_3$ complex can be described as being of the composition $TiCl_3 \cdot XAlCl_3$ in which X is a number in the range 0.1 to 1.0. A convenient method for the preparation of such a $TiCl_3$ complex is by reduction of titanium tetrachloride with metallic aluminum according to the formula $$3TiCl_4 + Al \rightarrow 3TiCl_3 \cdot AlCl_3$$

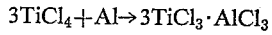

Hydrogen may be added to control flexural modulus and melt index.

It is to be noted that the conditions of polymerization depend on the monomer, catalyst and diluent employed. Broadly, the temperature preferred for particle form polymer is in the range of 70° to 250° F.

The term "polymer" includes both homopolymers and copolymers.

For simplification the invention will be described with reference to the production of polypropylene in a mass polymerization system, that is, in the presence of liquid propylene as the diluent and a catalyst comprising a dialkylaluminum halide and a titanium trichloride complex prepared by reacting aluminum with titanium tetrachloride.

The "particle form" polymer may be made in any type of reactor, but the use of a continuous path loop reactor has proven to have many advantages. In the loop reactor the diluent, catalyst, olefin and product solids are continuously circulated through the loop conduit at a velocity sufficient to prevent polymer deposition on the interior walls and in the turbulent flow range. These reactors generally comprise at least two horizontal legs joined by L's to at least two vertical legs.

A difficulty that has arisen with the loop reactor system is the recovery of the polymer solids from the continuously circulating contents within the reactor. The removal of a draw stream from the reactor results in the removal of catalyst, diluent and polymer solids without regard to their concentration. This necessitates the subsequent recovery of the diluent and catalyst solvents thereby increasing the expense of the system.

It has been proposed that a settling leg or receiving zone be attached to a lower portion of one of the horizontal legs of the reaction zone so as to collect therein a fraction concentrated in particulate solid polymer product with the solid particle form product being subsequently withdrawn from the receiving zone at periodic intervals. The use of the receiving zone or settling leg results in an increase in polymer concentration in the polymer product recovered thereby decreasing the load on the subsequent recovery steps.

It is also frequently necessary to wash the recovered polymer solids to remove catalyst and amorphous polymers. If a representative sample of the solids within the reactor is transferred from the loop reactor to the wash column the solids will contain a substantial amount of fines which are difficultly removable in the wash column and also result in a loss in production. It would be most desirable to preferentially remove the large particles of polymer solids from the reactor so that the smaller particles may remain and grow further so that all particles will be large enough to settle in the wash column. The preferred minimum size of particles for this to be accomplished should be above 25 microns.

It is an object of the invention to provide a novel loop reactor.

Another object of the invention is to provide a method and apparatus for producing large particles of polymer solids in a loop conduit reactor.

Yet another object of the invention is to provide a method and apparatus for the recovery of large particles from a loop conduit.

These and other objects of the invention will be readily apparent to those skilled in the art from the accompanying disclosure, drawing, and appended claims.

These objects are broadly accomplished for a substantially internally unobstructed loop conduit by inclining the loop conduit at an angle from the vertical, preferably at an angle from 15 to 75 degrees from the vertical.

In one respect the loop conduit contains turning vanes positioned radially in the L's so as to minimize mixing of the solids in the L's.

A wholly horizontal loop conduit reactor requires large quantities of power to keep the contents of the reactor circulating at a velocity sufficient to prevent the solids from settling and ultimately plugging the interior passageways of the loop. This extra energy is required because the turbulence must be great enough to stir the particles on the bottom and keep them moving. On the other hand, a vertical reactor requires a fluid velocity only great enough to overcome the settling velocity of the particles; however, the vertical legs are not conducive to the recovery of the larger particles preferentially from the polymer fines.

It has now been found that tilting the reactor slightly, preferably in a range from 15 to 75 degrees from the vertical, more preferably 30 to 60 degrees from the vertical, the larger solids preferentially move along the lower side of all parts of the reactor conduit. Generally, the tilt should be enough to settle the solids to the lower side in one pass through the loop with the solids then being withdrawn from the reactor by a settling leg or the like. Thus by withdrawing only the larger settled solids from the reaction zone the smaller particles have an opportunity to grow in size.

The velocity of the contents flowing or circulating throughout the reactor should be sufficiently high to prevent any accumulation of the polymer solids on the walls of the reactor due to gravity and preferably the solids will be in the highly turbulent flow range. The term "turbulent" is used herein in the conventional hydraulic sense, namely, as defining flow which is non-streamline or non-linear. Ordinarily fluid flow in terms of the conventional Reynolds number $$\left(\frac{\text{Diameter} \times \text{velocity} \times \text{density}}{\text{Viscosity}}\right)$$

is "linear" or "streamline" at values up to about 1200 and "turbulent" at values above 2200. Between these two values lies a transition region in which the flow may be either streamline or turbulent, depending on factors, such as, the roughness of the walls bounding the flow path. (See Crane Company Technical Paper No. 409, May 1942.) In the preparation of particle form polymer it has been found that operation of the reactor merely in the turbulent flow region does not prevent polymer deposition. In order to provide a process which operates continuously and for extended periods, it has been found necessary to maintain the reactor contents in a highly turbulent state and above a minimum flow velocity. The relationship between the various factors influencing the rate of settling of solids from a circulating slurry system is extremely complex. The minimum flow velocity as defined herein is that velocity below which the solids settles freely and are not suspended by eddy currents. As the velocity is increased above the minimum, a point is reached when the entire mass of solids is carried in a near homogeneous flow and there is no settling of solids from the top to the bottom of the horizontal pipe. This latter is the limiting velocity and is frequently referred to as the standard velocity. Among the more important factors are the volumetric fraction of solids in the slurry, internal pipe diameter, particle diameter and density, as well as density and viscosity of the carrying liquid which will contain some dissolved polymer which influences both factors. It has been found that for the polymerization of olefins, e.g. propylene, in a liquid hydrocarbon diluent, e.g. propylene, in a loop conduit, the following relationships are preferred:

TABLE A

| Loop Conduit Internal Diameter, inches | Preferred Flow Velocity Ranges, ft./sec. |
| --- | --- |
| 5 | 4–15 |
| 10 | 6–20 |
| 15 | 8–25 |
| 20 | 10–30 |
| 25 | 12–35 |
| 30 | 13–40 |
| 40 | 15–45 |

Obviously, the required minimum fluid velocities and the resultant Reynolds numbers employed in the process will also vary depending on the particular monomers which are polymerized, the diluent used, and the polymerization reaction conditions. The maximum Reynolds number can be as high as 25,000,000 to 35,000,000 or higher; however, power consumption increases rapidly at the higher values and it is preferred to operate in the lower ranges of flow velocity and Reynolds number.

While any suitable means may be provided for circulating the reactor contents, propeller means positioned within the interior of the loop content are particularly suitable. It is within the scope of the invention to provide other types of motive power. For example, the propellers can be replaced by a pump of the impeller type. With a suitably designed pump, namely one which provides a maximum of flow energy, it is possible to reduce or entirely eliminate the use of straightening vanes in the reactor. Any conventional driver including a motor, turbine, etc. can be utilized for actuating the propellers, pump or other motive means provided for moving the reactor contents.

Subsequent to the polymerization step a number of methods have been proposed for the removal of the catalyst residue from polymer, for example, by extraction with a suitable extracted extractant including aliphatic alcohols, carboxylic acid, hydroxy-substituted carboxylic acids, anhydrides of said acids and mixtures thereof. Also well suited as extractants are the diketones, particularly the alpha diketones and beta diketones. As discussed hereinbefore, it is particularly advantageous if a minimum of polymer fines are present during this treating step as well as during subsequent processing steps.

A more comprehensive understanding of the invention can be obtained by referring to the drawing which is a flow diagram illustrating a preferred embodiment of the invention.

While the drawing is described with regard to a process in which propylene is polymerized with a specific catalyst system employing the monomer in liquid phase without the addition of more than small amounts of an inert diluent, it is to be understood that it is not intended to limit the invention to this specific embodiment. As used herein, the term "mass polymerization" is used to designate a polymerization which is conducted with the monomer in liquid phase and without the addition of more than small amounts of an inert diluent.

Referring now to the drawing, propylene is charged to tilted reactor 10 through line 11. Lines 12 and 13, respectively, provide means for charging the catalyst ingredients, namely, the titanium trichloride complex and the diethylaluminum chloride, to the system. The hydrogen, if any, enters the propylene feed line through line 14 and is charged to the reactor along with the liquid propylene and $TiCl_3$ complex.

The reactor illustrated in the drawing is a loop-type tilted reactor which comprises two loops. Each loop is composed of two straight upright legs 16 disposed at an angle from the vertical of 15 to 75 degrees, preferably 30 to 60 degrees, and which may conveniently be in the form of elongated pipe sections. The ends of the legs of the reactor are conveniently interconnected by means of L's 17 so as to provide a continuous flow path through the reactor. The reactor is furnished with an impeller 19 which is operatively connected to a turbine 21. The operation of the impeller provides motive force for flowing the materials through the loop reactor. To assist in the maintenance of the gradient in polymer solids within the reactor, it is sometimes desirable to provide turning vanes 9 in the elbows which reduces turbulence in the elbows. Suitable vanes are as shown in the drawing which are radially attached to each sidewall of the reactor. The upright legs of the loop reactor are encompassed by heat exchange jackets 22 which are interconnected by means of lines 23. Line 24 connected to the heat exchange jacket associated with one of the outer legs provides means for introducing a coolant such as water. The coolant flows through the heat exchange jackets at a temperature and at a rate such as to maintain a desired polymerization temperature in the reactor. The coolant is removed from the reactor system by means of line 26 which is connected to the outer leg of the reactor.

The pressure employed in reactor 10 is sufficient to maintain the reactants in the liquid phase. In the case of the polymerization of propylene, the lower limit of pressure is about 225 p.s.i.g. at a polymerization temperature of about 90° F. The residence time in reactor 10 can range from about 1 to about 5 hours, with a residence time of about 3 hours being preferred.

The effluent stream recovered from reactor 10 through line 27 comprises solid polymer, catalyst residues, soluble polymer and liquid propylene. The stream usually contains in the range of 25 to 40, preferably about 35, weight percent solid polymer. The stream of solids within the reactor will generally range from about 10 mesh to less than 325 mesh. Preferably the recovered solids are at least 325 mesh and greater, more preferably from 10 to 100 mesh.

The solids may be removed from the reactor by any convenient means. The method of this invention lends itself particularly to the use of a settling leg attached to a lower portion of one of the legs since, due to the tilt, there is a gradient of solids across any given loop section. This appendage 20 to the loop reactor is attached in such a manner that the flowing reactants, solids and diluent will continuously pass the entrance thereto so that the heavier particles will continuously gravitate therefrom into the settling leg while the lighter diluent, polymer fines and reactants will continually flow across the entrance to the settling leg thereby resulting in the collection within said settling leg of a fraction concentrated in the larger particulate polymer solids. This settling leg may be of any type so long as the entrance thereto is large enough to prevent bridging of the polymer and not so large as to result in a undue amount of diluent and reactants being trapped in the receiving zone. The polymer accumulation rate in the settling leg is a function of the settling area, that is the diameter of the entrance to the receiving zone. The required length of the receiving zone or settling leg is also a function of the velocity as well as the inventory of polymer within the settling leg. For instance, when using a 10-inch I.D. reactor, a 1¼-inch settling leg and a velocity of approximately 8 feet per second, the turbulent zone extends approximately 5½ diameters into the settling leg so the length must extend past this point to provide a zone of relative quiet. Preferably the length of this settling leg would be at least 3 times, preferably 10 times, the diameter of the receiving zone, more preferably 4 to 40 times. In general, it is more advantageous to have a number of small diameter settling legs than a single large diameter unit to increase the flexibility of control over production rate. Other conventional types of setting tanks such as liquid solid cyclones, centraclone, centrifuge, etc. or a series of settling tanks may also be used. Preferably these settling vessels are located in a position where a minimum turbulence is located. Such accumulating points may be found in the elbows or behind protrusions into the liquid where the turbulent flow exists. Other points may be found along the lower side of the horizontal or inclined runs of the loop conduit if the velocity of such points is low enough for the liquid film of the wall to keep the large particles out of the main stream of flow.

At the lower extremity of the settling leg 20 may be located a valve 25 which periodically opens and closes completely so as to permit the removal of polymer to the product recovery zone.

Provision may be made within the receiving zone to control the temperature of the particular polymer therein to prevent secondary polymerization due to the further polymerization of the polymer due to the presence of catalysts therein. This secondary polymerization releases heat due to the exothermic reaction and causes fusion of the accumulated polymer product thereby resulting in the agglomeration of the product into a mass which would be difficult to remove from the receiving zone.

After removal of the effluent through line 27 it is passed through indirect heat exchange means 28, prior to introduction into a lower portion of contact tank 29. Line 30 provides means for introducing an extractant, for example acetylacetone, into the contact tank. Line 30 is connected to line 27 so that the acetylacetone enters the contact tank along with the effluent. In some cases hydrogen chloride may be evolved and it may be desirable to add propylene oxide or the like to the contact tank through line 30. The acetylacetone and propylene oxide can be introduced into line 27 undiluted or as a solution in a hydrocarbon which is inert to the reactants.

In contact tank 29 the acetylacetone is thoroughly mixed with the effluent from reactor 10. The contact tank depicted in the drawing comprises an enclosed vessel having baffle members 31 disposed in the upper and lower portion of the tank. The baffle members are attached to the walls of the tank and are each provided with a central opening through which the shaft of stirring means 32 passes. The positioning of the baffle members in this manner in effect divides the contact tank into upper, intermediate and lower sections. Each of these sections is provided with a stirrer 33 which is attached to the shaft of stirring means 32. It has been found that particularly good contact is contained between the acetylacetone and the effluent from reactor 10 when utilized in this specific structure.

The removal of catalyst residues and the removal of low molecular weight polymer from the polymerizate is enhanced if the contactor is divided into a heating zone and a cooling zone. When contacting a polymerizate of propylene in a contact zone in the presence of acetylacetone and propylene oxide, it is preferred that the heated portion of the contact zone, including the lower and intermediate sections as depicted in the drawing, be maintained at about 140° F. with a range of about 130° F. minimum to a 160° F. maximum, with the upper cooled portion having a 110° F. minimum and 130° F. maximum, preferably in the range of 115 to 120° F. Pressure within the contacting tower is sufficient to maintain the diluent in a liquid phase, preferably in the range of 400 to 500 p.s.i.a.

The coolant enters through conduit 79, passes through the annulus formed by jacket 36 and exit through conduit 80. The heating fluid enters through conduit 81, passes through the annulus formed by jacket 34 and exits through 82, valve 83 and conduit 85. A temperature-sensing device 84 determines the temperature within the lower portion of the contactor and actuates motor valve 83 so as to control the temperature in the lower portion of the contactor.

The treated effluent is withdrawn from an upper portion of contact tank 29 through line 37 and is then passed into the upper portion of wash column 38. The treated effluent, containing the polymer, soluble polymer, polymer fines extractant and catalyst residues, is preferably contacted countercurrently with liquid propylene introduced through conduit 39. The propylene, containing soluble polymer and catalyst residues, is removed through conduit 40 with any polymer fines carryover being removed through filter 41. The load on this filter is thus drastically reduced if only the larger particles are removed from the loop reactor. The liquid is then passed through conduit 42 to a suitable treating zone for the removal of the extractant so that the liquid propylene may be recycled.

Although various light hydrocarbons, particularly paraffinic hydrocarbons containing from 4 to 6 carbon atoms per molecule, such as normal pentane, are employable as the wash liquid, it is preferred to utilize the liquid monomer, such as propylene.

It is only necessary that the wash liquid be provided at a velocity and a volume sufficient to remove substantially all of the remaining traces of extractant and catalyst residues contained in the slurry of polymer. A slurry of solid polymer in particle form and liquid propylene is then withdrawn from the bottom of the wash column through conduit 43 and valve 44 which operates as a pressure letdown valve into flash tank 58 wherein the propylene flashes off.

The slurry in conduit 43 is introduced into an elongated confined zone heated by indirect heat exchange, such as by steam entering through conduit 49 and exiting through conduit 50. As the slurry passes through confined zone 47 it is heated and the liquid hydrocarbon components of the slurry are vaporized resulting in a flow of dry powder which has a substantially higher velocity than the velocity of the liquid entering into the coil. Although shown as a progressively expanding jacketed tube, it is sometimes preferred to employ a uniform diameter jacketed pipe or tube. The vapors discharge through conduit 59 into cyclone separator 60 wherein any solid material contained in the gaseous propylene stream is recovered as underflow through line 61 and is usually discarded. The gaseous propylene is recovered as the overflow through line 62 and after suitable purification operations is reused in the process.

Solid polymer in particle form and containing residual amounts of propylene is withdrawn from the bottom of flash tank 58 and falls into a heated dryer conveyor 63. The heat exchange fluid is introduced into the jacket through line 65 and is withdrawn through line 66. Conveyor 63 is provided with an auger 64 which is powered by a motor 67. The propylene vapors are removed from conveyor 63 through the flash tank 58. After the polymer solids are conveyed to the end of conveyor 63, they are passed through rotary valve 69 positioned in conduit 79. The polymer solids then drop into a purge conveyor 72 which contains an auger 73 driven by motor 74. As the solids are moved through conveyor 72, they are contacted with a heated non-combustible gas introduced through line 76. Any suitable non-combustible gas such as carbon dioxide, nitrogen, or the like can be utilized. In flowing through conveyor 72, the gas contacts the polymer solids as they are moved therethrough, thereby evaporating residual amounts of propylene and also purging previously evaporated propylene. The gases are withdrawn from conveyor 72 through line 77 after which they are flared. Polymer solids substantially free of propylene having an ash content of less than 0.01 weight percent are recovered from purge conveyor 72 through line 78. The polymer so recovered can then be transferred to a suitable storage facility or to subsequent operations such as packaging or pelleting.

In one embodiment of the invention 117,000 #/s.d.[1] of propylene are fed to a 20-inch I.D. loop reactor in the presence of hydrogen and 225 #/s.d. of diethylaluminum chloride and 140 #/s.d. of a titanium trichloride complex. The complex was prepared by reacting aluminum with $TiCl_4$ and contains 4.74 weight percent Al, 25.0 weight percent Ti and 69.8 weight percent Cl. The reactor is tilted at an angle of 40 degrees from the vertical and the flow velocity of the reactor contents is 10 feet per second. The reactor is maintained at 140° F. and 400 p.s.i.g. The settling leg has an entrance diameter of 4 inches and is 40 inches long. The concentration of solids in the reactor is about 30 percent and is increased to about 60 percent in the settling leg. The residence time for the reactants in the loop averages about 3 hours. About 90,000 #/s.d. of effluent are removed from the reactor.

In comparison with a vertically disposed loop reactor operating under the same conditions as above, the inclined loop showed a decided improvement in concentration of the larger particles for recovery. Of particular importance is the reduction in polymer fines. Analysis of the product polymer recovered after drying is as follows:

| Mesh | 20 | 30 | 60 | 80 | 100 | 200 | 325 | Pan |
|---|---|---|---|---|---|---|---|---|
| Weight percent: | | | | | | | | |
| Control | 4 | 6 | 27 | 13 | 5 | 19 | 15 | 11 |
| Inclined Loop | 6 | 10 | 35 | 15 | 9 | 15 | 8 | 2 |

While certain examples, structures, composition and process steps have been described for purposes of illustration, the invention is not limited to these. Variation and modification within the scope of this disclosure and the claims can readily be effected by those skilled in the art.

I claim:
1. In a process for the formation of a particulate polymer solids from at least 1-olefin selected from the group consisting of ethylene, propylene and mixtures of ethylene with unsaturated hydrocarbons copolyemrizable therewith and selected from the group consisting of 1-olefins having a maximum of 8 carbon atoms per molecule and no branching nearer the double bond than the 4-position and diolefins in the presence of a polymerization catalyst therefor in a liquid hydrocarbon diluent, said catalyst, olefin, and diluent being circulated in a smooth closed continuous path reaction zone under polymerization conditions such that substantially all the polymer produced is insoluble in said diluent and in the form of solid particles of polymer, the improvement comprising inclining said zone at an angle from 15 to 75 degrees from the vertical and adjusting the velocity of the circulating contents of the reaction zone so as to provide a gradient of polymer particle size in at least the lower portion of the reaction zone and withdrawing the larger size by gravity flow from the lower portion of said zone.

2. The process of claim 1 wherein said angle is from 30 to 60 degrees.

3. In a process for the formation of particular polymer solids from propylene in the presence of a catalyst comprising a dialkyl aluminum compound and a titanium trichloride complex and liquid propylene as the hydrocarbon diluent comprising circulating the catalyst, propylene and solids in a smooth closed path reaction zone having a substantial uniform cross section at a tempera- ---
[1] Pounds per stream day.

ture in the range of between about 250 and about 70° F. and under polymerization conditions such that substantially all the polymer produced is insoluble in said propylene and in the form of polymer particles ranging in size from about 10 mesh to less than 325 mesh, the improvement comprising inclining said zone at an angle from 30 to 60 degrees from the vertical and adjusting the velocity of the circulating contents of the reaction zone to about 5 to about 15 feet per second so as to provide a gradient of polymer particle size in each portion of the reaction zone from the exterior to the interior portion thereof and withdrawing the larger solids by gravity flow from the lower portion of said zone.

4. The process of claim 3 wherein the solids are recovered from an area of minimum turbulence within said zone.

References Cited

UNITED STATES PATENTS

| | | | |
|---|---|---|---|
| 1,827,727 | 10/1931 | Blizard | 137—561 |
| 2,723,680 | 11/1955 | Danel | 260—94.9 |
| 3,203,680 | 8/1965 | Houser | 260—94.9 |
| 3,244,681 | 4/1966 | Rohlfing | 260—93.7 |

JOSEPH L. SCHOFER, *Primary Examiner.*

JAMES A. SEIDLECK, F. L. DENSON,
*Assistant Examiners.*